T. W. MILLER.
RUBBER BULB.
APPLICATION FILED MAY 15, 1915.

1,198,384.

Patented Sept. 12, 1916.

The Old Way.

The New Way.

Witness
Edwin L. Jewell

Inventor
Thomas W. Miller
By Percy B. Hills
Attorney

UNITED STATES PATENT OFFICE.

THOMAS W. MILLER, OF ASHLAND, OHIO, ASSIGNOR TO THE FAULTLESS RUBBER COMPANY, OF ASHLAND, OHIO, A CORPORATION OF OHIO.

RUBBER BULB.

1,198,384.  Specification of Letters Patent.  Patented Sept. 12, 1916.

Application filed May 15, 1915.  Serial No. 28,315.

*To all whom it may concern:*

Be it known that I, THOMAS W. MILLER, a citizen of the United States, residing at Ashland, in the county of Ashland and State of Ohio, have invented certain new and useful Improvements in Rubber Bulbs, of which the following is a specification.

My invention relates to syringe bulbs and similar apertured articles, and has for its object the production of a bulb in which the wall of the stem receiving aperture is projected inward.

Figure 1:
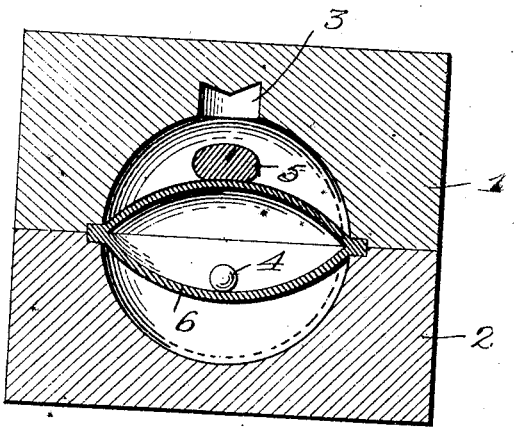
Figure 2:
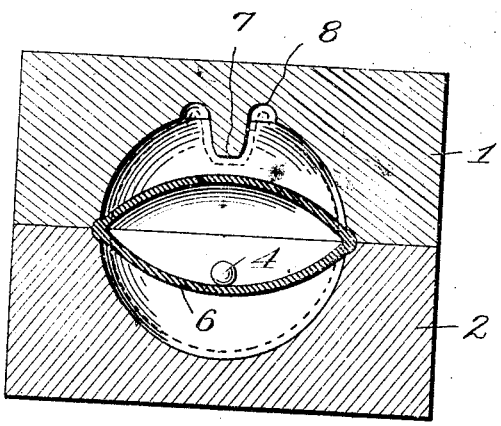
Figure 3:
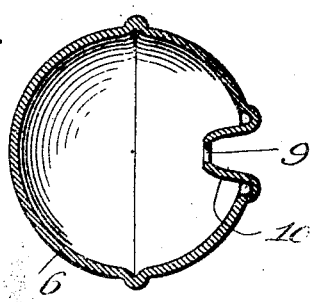

In the accompanying drawing: Figure 1 is a sectional view of a mold containing therein the partly formed bulb, and illustrating an old and well known method of completing the manufacture of the bulb, wherein the stem receiving portion projects outwardly from the surface of the bulb. Fig. 2 is a view similar to Fig. 1, disclosing my improved mold for forming bulbs having the wall of the stem receiving aperture projecting inward. Fig. 3 is a transverse sectional view of one of my improved bulbs.

The two sections 1 and 2 of the molds shown in Figs. 1 and 2 are substantially the same except that in the mold shown in Fig. 1, the section 1 is recessed at 3 to form an exterior projection on the surface of the bulb 6 formed therein, said projection serving, when bored, as a neck for receiving the syringe tube. These bulbs are formed in a well known manner, the same being preformed and partially inflated and having inclosed therein a moisture-carrying substance 4, for instance, soapstone saturated with water, the result being that when the partially completed bulb is disposed between the sections 1, 2 of the mold and heated, the steam generated from the moisture in the soapstone 4 will instantly expand the bulb to the inner configuration of the wall sections.

My present invention aims to dispense with an outwardly projecting neck, and this is accomplished by forming the mold section 1 with an internally projecting portion 7 surrounded by an annular groove 8 if desired. The bulb being placed in position in this mold and the saturated soapstone 4 being located within the bulb 6, upon the application of heat the same will expand to the interior configuration of the mold and will also expand around the projection 7 and into the depression 8, said depression not being deep enough to offer an obstacle to such expansion. The bulb 6 upon removal from the mold is provided with the aperture 9 at the inner end of the inwardly projecting annular wall 10 formed by the projection 7 of the mold section 1, and is ready to receive the syringe tube or stem in the usual manner.

By inturning the tube receiving wall 10, it has been found that the same will hug the syringe stem more closely and upon compression of the bulb 6 will tend more firmly to clasp said stem. In the construction of bulb formed in the manner illustrated in Fig. 1, where the stem receiving portion is exterior to the bulb proper, the act of compressing the bulb tends to cause said stem receiving portion to open and leave the stem, in a manner directly opposite to the compressing action of the inturned wall 10.

As shown in Fig. 3, the bulb 6 has formed thereon an annular flange 11, disposed around the inturned wall 10, the same affording a strengthening means at that point, and preventing collapse of the bulb as the syringe tube is inserted therein.

Having thus described my invention, what I claim as new and desire to secure by Letters Patent, is:—

1. A bulb, having its tube receiving wall inturned.

2. A bulb, having its tube receiving wall inturned, and formed with an integral external annular flange around said tube receiving wall.

In testimony whereof I have hereunto set my hand this 30th day of April, 1915.

THOMAS W. MILLER.